Feb. 7, 1933.  F. W. GAY  1,896,399
SYSTEM OF ELECTRIC TRANSMISSIONS
Filed Dec. 11, 1930   2 Sheets-Sheet 1

INVENTOR
Frazer W. Gay

Feb. 7, 1933.  F. W. GAY  1,896,399
SYSTEM OF ELECTRIC TRANSMISSIONS
Filed Dec. 11, 1930   2 Sheets-Sheet 2
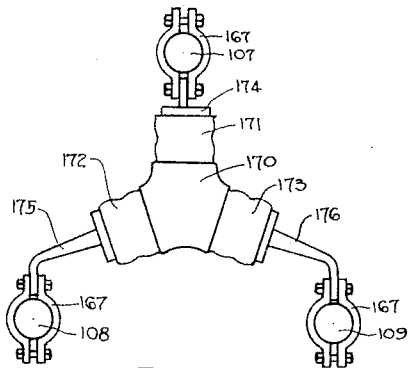
FIG. 4
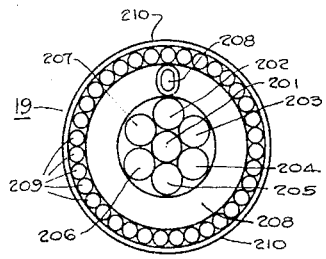
FIG. 5
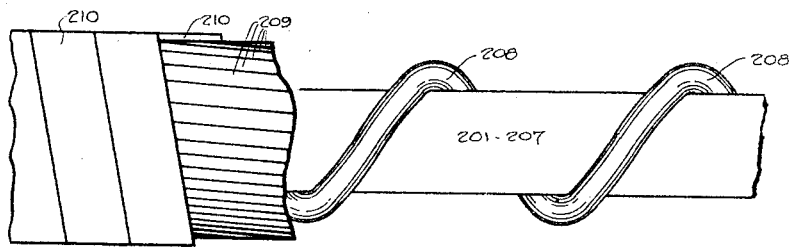
FIG. 6
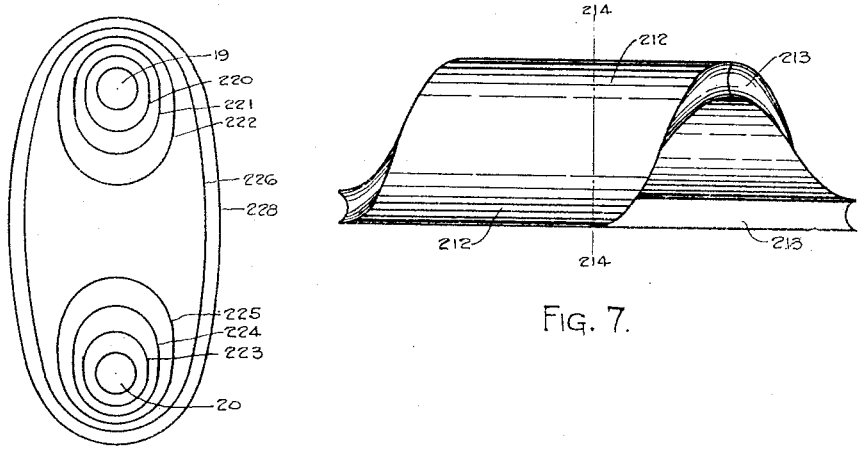
FIG. 8.
FIG. 7.
INVENTOR
Frazer W. Gay Patented Feb. 7, 1933

1,896,399

UNITED STATES PATENT OFFICE

FRAZER W. GAY, OF NEWARK, NEW JERSEY

SYSTEM OF ELECTRIC TRANSMISSIONS

Application filed December 11, 1930. Serial No. 501,607.

This invention relates to a novel transmission system including conductors adapted to offer maximum susceptance to alternating currents and an arrangement of conductors in each phase of said transmission system cooperating with said individual conductors to give to each line in the system maximum susceptance to alternating current.

It is well known in the art that two conductors of the same conductivity and very different diameters have very different admittance to alternating current, the greater diameter favoring greater admittance. On this account aluminum cables are preferred to copper for transmission lines, since for the same conductivity the aluminum cables have greater admittance.

I propose to greatly enlarge the diameter of the individual conductors and in addition use two or more conductors per phase in each transmission line and also provide transformer means whereby the currents in the individual conductors are normally kept substantially equal.

It is an object of this invention to provide an electric conductor for alternating current of large diameter and having the major part of its conducting mass located adjacent to the surface.

It is a further object of this invention to so design said conductor that the conducting mass is flexibly yet firmly held on a strong core so that the cable may be coiled and uncoiled without kinking and the conducting mass will always tend to take a substantially cylindrical shape.

It is a further object of this invention to provide two or more equally spaced conductors to form one phase of a polyphase system.

It is a further object of this invention to carry a plurality of conductors spaced and separately insulated with respect to each other on each insulator string of a high voltage transmission line.

It is a further object of this invention to provide, in addition to suitable transposition, means for maintaining the normal phase current substantially equally divided among the separate conductors of that phase.

It is a further object of this invention to firmly secure cleats to each conductor in process of manufacture whereby these cleats may be used as means to secure the separate conductors together through insulators; these cleats being exactly spaced in the factory so that all the conductors in a phase are uniformly stressed throughout their length and share the total sag stress equally when strung upon on towers.

The invention may be more readily understood by referring to the drawings in which Figure 1 is a diagrammatic representation of a three phase transmission line of the present invention having duplicate conductors per phase.

Figure 4 is a section of one phase of the transmission line shown in Figure 2 illustrating the method of separating the conductors.

Figure 5 is a cross section of one of the conductors of the transmission line shown in Figures 1 and 2.

Figure 6 is a side elevation partly in section of the conductor shown in Figure 5.

Figure 7 is a side elevation of packing which is woven into the conductor illustrated in Figures 5 and 6 at points where clamps are applied.

Figure 8 is a diagrammatic representation in cross section of the conductor of one phase shown in Figure 1. It illustrates the increase of reluctance to the reactance flux obtained by dividing the current.

Figure 1:
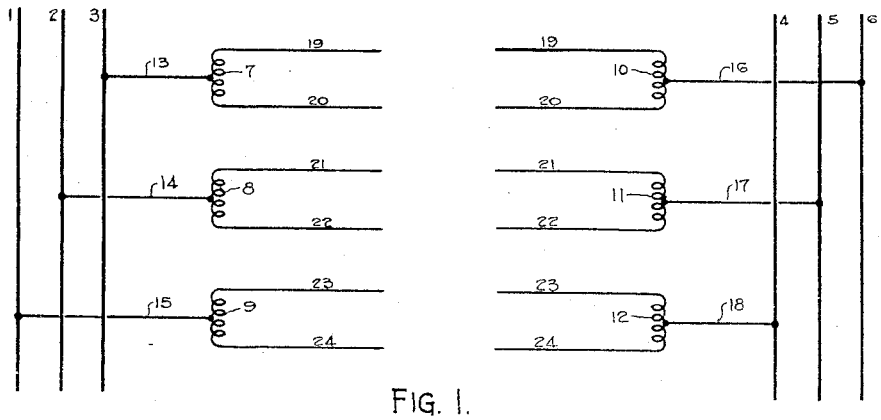

Figure 1 shows a generator bus 1, 2, 3 connected to a load bus 4, 5, 6 by a three phase transmission line having conductors 19 and 20 in one phase. 21 and 22 in a second phase, and 23 and 24 in a third phase. Each two conductors as 19 and 20 are connected at both ends to the end terminals of auto transformer windings as 7 and 10. The mid points of these auto transformers are connected respectively to busses 3 and 6 by leads 13 and 16. Similarly generator bus 2 is connected to load bus 5 by lead 14, auto transformer 8, parallel transmission conductors 21 and 22, load bus auto transformer 11 and lead 17. Generator bus 1 is connected to load bus 4 by lead 15, auto transformer 9, parallel conductors 23 and 24, load bus auto transformer 12 and lead 18.

Figure 2:
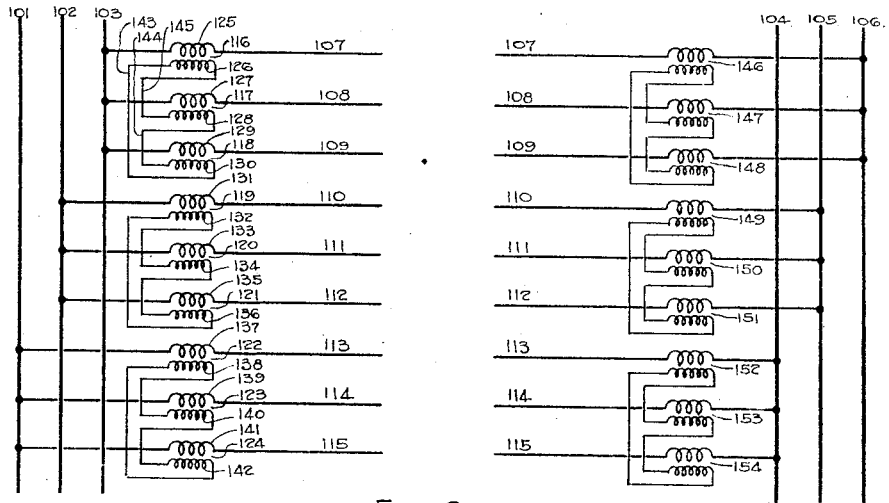
Figure 2 is a diagrammatic representation of a similar three phase transmission line except having three conductors in multiple per phase.

Figure 2 shows a generator bus 103 connected to a load bus 106 by three parallel transmission conductors 107, 108, 109 and a generator bus 102 connected to a load bus 105 by three parallel transmission conductors 110, 111, and 112 and a generator bus 101 connected to a load bus 104 through three parallel phase conductors 113, 114, and 115. Each three parallel conductors as 107, 108, 109 connecting generator bus 103 to load bus 106 has transformers as 116, 117, 118 connected in series at the generator bus end and transformers 146, 147, 148 connected in series respectively at the load bus end. At the generator bus end of the line and at the load bus end of the line the secondaries of these transformers are connected in series relation as by leads 143, 144, 145 at the generator bus end of transformers 116, 117, 118. The secondaries are so connected that the currents induced in the secondaries by equal load currents in the primaries all tend to flow around the secondary circuit in the same direction.

Figure 3:
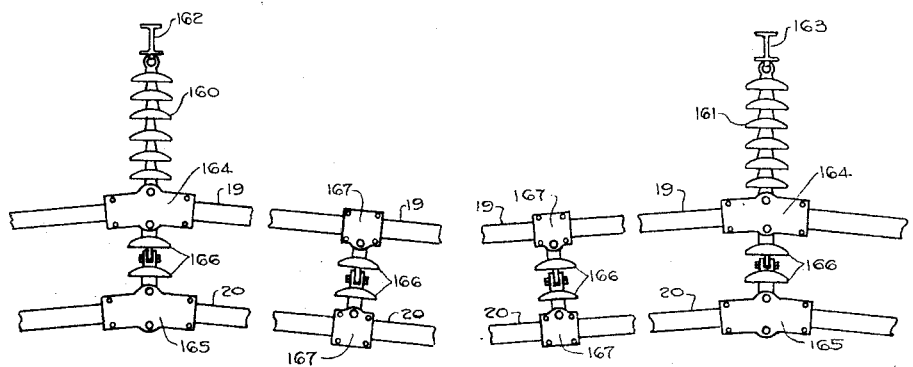
Figure 3 is an elevation of portions of one phase of the transmission line shown in Figure 1.

Figure 3 shows the conductors of one phase of the transmission line of Figure 1 (Nos. 19 and 20) in elevation where they are supported at the two adjacent tower supports 162 and 163. At tower support 162 conductor 19 is held by conductor clamps 164 and conductor 20 is held by conductor clamps 165. Conductor clamps 164 are attached to transmission line tower 162 by the insulator string 160 in the usual way. Conductor clamps 165 are attached to conductor clamps 164 by insulators 166. Conductor clamps 164 are suspended from tower support 163 by insulator string 161 in the usual way. Conductor clamps 165 are attached to conductor clamps 164 by insulators 166. Conductors 19 and 20 are further shown as being spaced apart intermediate the tower supports 162 and 163 by insulators 166 attached to clamps 167.

Figure 4 shows a method of spacing apart three conductors as 107, 108, and 109, shown in Figure 2, constituting the three parallel conductors of one phase. An insulator 170, preferably of porcelain has three projecting insulating prongs 171, 172, and 173. To these prongs are attached the metal lugs 174, 175, and 176. To these metal lugs are attached the conductor clamps 167, 167, and 167 by which conductors 107, 108, and 109 are attached to the metal lugs 174, 175, and 176 and thereby kept equally spaced from each other at the tower supports and at the necessary intermediate points.

Figure 5 shows a cross section of conductor 19 of Figure 1 and is a preferred method of constructing the novel conductors of the present invention whereby said conductors offer low reactance to the passage of alternating current. 201, 202, 203, 204, 205, 206, and 207 constitute the steel strands of a messenger cable around which is spirally wound the flexible metal tube 208. Metal tube 208 is preferably a spiral of strip spring bronze. Tube 208 is wound around the messenger cable with an opposite spiral to that taken by the wires of the steel messenger cable. The metallic electrical conductors 209, 209, etc. are wound in a long spiral outside the tube 208 so as to constitute in effect a conducting cylinder. Conductors 209, 209, etc. are wound in a long spiral of opposite thread to that of tube 208. The conductors 209 are preferably of aluminum. In the preferred form of the invention the conducting wires 209, 209, etc. are kept in place by an outside wrapping of metallic wire or strip 210.

Figure 6 is a side elevation of the conductor shown in Figure 5 partly in cross section in which similar parts are similarly numbered. The tube 208 is shown spirally wound on the messenger cable 201—207 and the electric conductors 209 are shown held in place by the spirally wound strip 210.

Figure 7 shows a padding adapted to slip over the messenger cable 201—207 and between the convolutions 208, 208 of the spirally wound tube. This packing is preferably of a high melting point material and is in two halves 212 and 213 and is adapted to slip over the messenger cable 201—207 as at a point on the cable directly above it in Figure 6. This packing is preferably slipped on the messenger cable at the exact points desired when it is being wound in the factory and clamps as 167 Figure 3, are applied at this point as soon as these pads have passed through the machine. Clamps 167, Figure 3 and Figure 4, have their inside surfaces slightly convoluted circumferentially so that when clamps 167 are bolted together the convolutions force the conductors 209, 209 down into the packing 212, 213 and in turn force the packing down into the convolutions of the messenger cable 201—207. At points where it becomes necessary to apply clamps as at 164 and 165 Figure 3 in the field, small holes may be drilled through the conducting surfaces and a cement or suitable molten metal may be poured in. This will not run far in the cable, due first to the tendency to rapidly solidify and second to the opposition to longitudinal flow that it meets in the spiral convolutions of the tube 208.

Figure 8 shows spaced conductors 19 and 20 of Figure 1 in cross section. It will be seen that that part of the magnetic flux as at 220, 221, 222 about conductor 19 and 223, 224, 225 about conductor 20 has its average magnetic path lengthened by reason of the large diameter of conductors 19 and 20. These magnetic paths however are relatively short in respect to the magnetic paths 226 and 228 surrounding both conductors in common. It will be noted that the magnetism following the relatively short paths of relatively low reluctance as 220, 221, 222, and 223, 224, 225 is motivated by only ½ of the total current, while that magnetic flux that is motivated by the entire current has to follow the long and hence high reluctance paths as 226, 227, 228, etc.

The operation of this invention is as follows.

The parallel conductors in a given phase as 19 and 20 Figure 1 have their reactances made as nearly equal as possible by transposition i. e. by being moved about throughout the length of the transmission line so that each of these conductors occupies an equivalent position with respect to the other conductors of the circuit for an equal length of its circuit. The currents in the two conductors are still further compelled to equalize by the auto transformers 7 and 10. Any tendency for instance for conductor 19 to take an excess portion of current over that taken by conductor 20 will cause the upper halves of auto transformers 7 and 10 in Figure 1 to oppose a reactive voltage to the flow of such an excess portion and the lower halves of auto transformers 7 and 10 will have induced in them a voltage of substantially equal value but of opposite polarity. The voltages produced in the upper halves of transformers 7 and 10 will retard the excess portion of current tending to flow in 19 and the voltages induced in the lower halves of the auto transformers 7 and 10 will tend to increase the current in conductor 20. If the upper halves of transformer windings 7 and 10 are closely interlaced with the lower halves, the currents in conductors 19 and 20 may be expected to be substantially the same. This equality will be still further maintained if iron is added to the magnetic circuits of the auto transformers 7 and 10.

It is well known in the art that the ratio of reactance to resistance increases in a transmission line when the conductivity of the line is increased in proportion to the increase in current that such a line is required to carry. As the capacity of a line is increased with load as by increasing its copper section, the reactance voltage at full load soon reaches a considerable percentage of the transmission voltage in the case of a long line. Generally an adjacent three phase line is installed and operated in multiple with the first line before the reactance voltage at full load reaches 50% of line voltage. Such a policy generally involves the purchase of additional right of way for the new over head transmission line. In a similar case I propose to secure a greatly increased capacity by my novel construction of line without the necessity of purchasing additional right of way.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A polyphase transmission tower line comprising a plurality of conductors per phase, a high voltage insulator at each supporting tower acting as a common support for all the conductors in one phase, and low voltage insulators maintaining each conductor in a phase in spaced and separately insulated relation to every other conductor in said phase, each conductor in a phase being transposed with respect to the conductors of the remaining phases.

2. A polyphase transmission tower line comprising a plurality of conductors per phase, the spacing of any two conductors of a phase having a value that is a substantial percentage of the distance between conductors of differing phases, whereby said transmission line has a relatively low impedance, a high voltage insulator at each supporting tower acting as a common support for all the conductors in one phase, and low voltage insulators maintaining each conductor in a phase in an equally spaced and separately insulated relation to every other conductor in said phase.

3. A polyphase transmission tower line comprising, a plurality of large diameter line conductors per phase, the spacing of any two conductors of a phase being relatively great and of a magnitude that is a substantial percentage of the distance between conductors of different phases, whereby said transmission line has a relatively low impedance, a high voltage insulator at each supporting tower acting as a common support for all the conductors in a phase, and additional insulators serving to maintain each conductor in a phase in spaced and separately insulated relation to any other conductor in said phase.

FRAZER W. GAY.